T. H. DAVIS.
LUBRICATOR NIPPLE.
APPLICATION FILED MAR. 19, 1920.

1,366,065.

Patented Jan. 18, 1921.

Inventor
Theodore H. Davis.
By William Bradbury
Attorneys

UNITED STATES PATENT OFFICE.

THEODORE H. DAVIS, OF CHICAGO, ILLINOIS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATOR-NIPPLE.

1,366,065.  Specification of Letters Patent.  Patented Jan. 18, 1921.

Application filed March 19, 1920. Serial No. 367,128.

*To all whom it may concern:*

Be it known that I, THEODORE H. DAVIS, a citizen of the United States, residing at Chicago, in the county of Cook and State of Illinois, have invented a certain new and useful Improvement in Lubricator-Nipples, of which the following is a full, clear, concise, and exact description, reference being had to the accompanying drawings, forming a part of this specification.

My invention relates to improvements in lubricator nipples, and is especially concerned with improvements in lubricator nipples of a type wherein is disclosed a lubricator nipple used for transmitting lubricant under pressure to the bearings of a centrifugal water pump or other mechanisms where the lubricant in the bearings is subjected to back pressure, tending to force the lubricant from the bearing.

The objects of my invention are:

First: To provide a nipple of the character described, in which the clearance passages for the lubricant are sufficiently large so as not to become clogged up with lint, dirt, and other foreign substances usually found in lubricant;

Second: To provide a nipple of the character described, which can be easily disassembled for the purpose of cleaning; and Third: To provide a nipple which can be economically manufactured.

Other objects will appear as this description progresses, reference being had to the accompanying drawings, in which—

Figure 2:
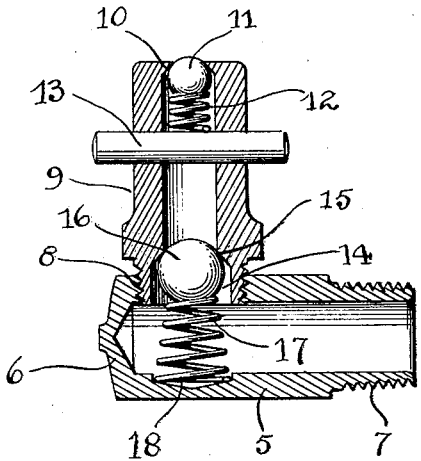
Fig. 2 is a central longitudinal section therethrough.
Figure 1:
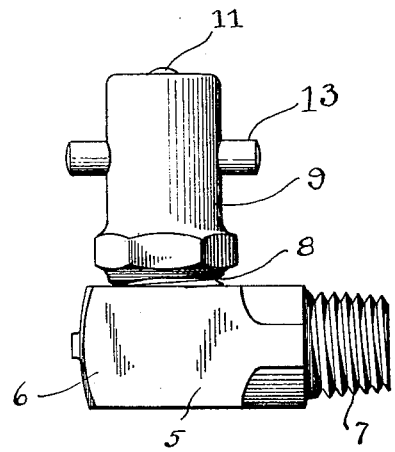
Figure 1 is a side elevation of my improved nipple.

Referring to the drawings, the reference character 5 indicates an elongated tubular member, one end of which is closed, as shown at 6, and the other end of which is open and provided with external screw threads 7, by means of which it can be attached to the bearing to be lubricated. A screwthreaded opening is formed in one side of the tubular member 5 adjacent the closed end 6, to receive the externally screw-threaded end 8 of a second tubular member 9, the free end of which is flanged over, as shown at 10, to provide a valve seat for the closure 11. The closure 11 is held on a seat by a spring 12, the inner end of which rests upon a pin 13 extending through the second tubular member, and from both sides thereof.

The inner end of the tubular member 9 is countersunk as shown at 14, to provide a seat 15 for a ball valve 16, which is retained on its seat by a spiral spring 17, one end of which contacts with the valve 16, and the other end of which is seated in the countersink 18 formed in the inner side of the tubular member 5 opposite the opening which receives the screw threaded end 8 of the tubular member 9.

From the above description it will be clear that when lubricant is forced through the nipple under pressure, the spring 17 will be compressed to a certain extent, thereby allowing the lubricant to be discharged on any or all sides of the valve 16 and around the spring 17. The spring 17 is not as large in diameter as the bore of the tubular member 5, and consequently the lubricant will have ample clearance space between the sides of the spring and the sides of the tubular member.

In time, lint, dirt, and other foreign matter which is usually found in the lubricant will become lodged in the coils of the spring 17, and it will then be necessary to detach the tubular member 9 from the tubular member 5, for the purpose of cleaning this spring and other portions of the nipple. With the construction just described, it is an easy matter to detach these two members and remove the spring for cleaning. The construction of my improved nipple is such that it can be very economically manufactured.

While I have described the details of the preferred embodiment of my invention, it is to be clearly understood that my invention is not limited to these details, but is capable of other adaptations and modifications within the scope of the appended claims.

Having thus described my invention, what I claim is:

1. A lubricator nipple comprising a hollow elongated member, one end of which is closed and the other end of which is open and provided with means for securing said member to means to be lubricated, the said member being provided with an opening in one side thereof adjacent said closed end, a second hollow elongated member having one end secured in said opening, the said end being provided with a counterbore forming a valve seat, a valve for co-acting with said valve seat, a spiral spring having one end bearing against the side of said valve opposite said seat, the other end of said spring being seated in a counter-sink formed in the inner wall of said first member opposite said opening, and a spring pressed closure for the other end of said second member.

2. A lubricator nipple comprising a hollow elongated member, one end of which is closed and the other end of which is open and provided with means for securing said member to means to be lubricated, the said member being provided with an opening in one side thereof adjacent said closed end, a second hollow elongated member having one end secured in said opening, the said end being provided with a valve seat, a valve for co-acting with said valve seat, a spring having one end bearing against the side of said valve opposite said seat, the other end of said spring being seated on the inner wall of said first member opposite said opening, and a spring pressed closure for the other end of said second member.

3. A lubricator nipple comprising a hollow elongated member, one end of which is closed and the other end of which is open, and provided with means for securing said member to means to be lubricated, the said member being provided with an opening in one side thereof, a second hollow elongated member having one end secured in said opening, the said end being provided with a valve seat, a valve for co-acting with said valve seat, a spring for holding said valve on said seat, and a spring pressed closure for the other end of said second member.

4. A lubricator nipple comprising a tubular member, one end of which is closed and the other end of which is open, the said tubular member having an opening formed in one side thereof, of a second tubular member having one end secured in said opening and provided with a valve seat, a spring for holding said valve on said seat, and a spring pressed closure for the opposite end of said tubular member.

5. A lubricator nipple comprising two tubular members provided with means for detachably securing one to the other in communication with each other, of a spring pressed closure in the end of one of said tubular members, and a spring pressed valve bearing against the other end of said member.

In witness whereof, I hereunto subscribe my name this 11th day of March, 1920.

THEODORE H. DAVIS.

Witnesses:
 MARY A. COOK,
 ANDREW WINTERCORN.